(12) United States Patent
Bhattacharya

(10) Patent No.: US 6,910,132 B1
(45) Date of Patent: Jun. 21, 2005

(54) SECURE SYSTEM AND METHOD FOR ACCESSING FILES IN COMPUTERS USING FINGERPRINTS

(75) Inventor: Prabir Bhattacharya, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 612 days.

(21) Appl. No.: 09/662,298

(22) Filed: Sep. 15, 2000

(51) Int. Cl.$^7$ .............................................. H04K 1/00
(52) U.S. Cl. ........................ 713/186; 713/201; 707/1
(58) Field of Search ................................ 713/186, 201, 713/165–166, 200, 202; 705/56; 380/4; 382/115, 124, 125, 126, 312; 709/225

(56) References Cited

U.S. PATENT DOCUMENTS

| | | | | |
|---|---|---|---|---|
| 3,859,633 | A | 1/1975 | Ho et al. | 382/125 |
| 4,429,413 | A | 1/1984 | Edwards | 382/124 |
| 4,993,068 | A | 2/1991 | Piosenka et al. | |
| 5,239,590 | A | 8/1993 | Yamamoto | 382/125 |
| 5,337,357 | A | 8/1994 | Chou et al. | 705/56 |

(Continued)

FOREIGN PATENT DOCUMENTS

| | | |
|---|---|---|
| EP | 0 905 646 A1 | 3/1999 |
| EP | 0905646 A1 | 3/1999 |
| EP | 0 923 018 A2 | 6/1999 |
| WO | WO 97/29477 | 8/1997 |
| WO | WO 00/25214 | 5/2000 |

OTHER PUBLICATIONS

Jim Press, "Object Oriented Cryptographic Facility Design: Export Considerations", ICI, Computers & Security, Elsevier Science PUblishers, Amsterdam, NL, vol. 15, No. 6, 1996, pp. 507–514.

Azriel Rosenfeld and Avinash C. Kak, "Digital Picture Processing," Second Edition vol. 2, Academic Press, Inc., Harcourt Brace Jovanovich, Publishers.

Raffaele Cappelli, Alessandra Lumini, Dario Mario, Member, IEEE, and Davide Maltoni, "Fingerprint Classification By Directional Image Partitioning," IEEE Transactions On Pattern Analysis And Machine Intelligence, vol. 21, No. 5, May 1999.

European Search Report for Application No. 01307861.3; Jun. 20, 2022.

*Primary Examiner*—Charles Rones
*Assistant Examiner*—Neveen Abel-Jalil
(74) *Attorney, Agent, or Firm*—Harness, Dickey & Pierce, PLC

(57) ABSTRACT

The user's fingerprint is analyzed by the pattern matching module which draws upon pre-stored fingerprint data that may be encrypted. The pattern matching module work in conjuntion with an authorization module and resource access module to ascertain a user's authorization level or security level and then give the user access to only those computer resources for which he or she has been granted authorization. The system preferably employs inter-modular encryption so that the system can be distributed across a network if desired.

13 Claims, 3 Drawing Sheets

| Resource ID | Authorization Level Required |
|---|---|
| secret_data.doc | Top Secret |
| grocery_list.doc | Unclassified |
| ⋮ | |
| print function | Secret |
| save function | Confidential |
| ⋮ | |
| export feature | Top Secret |

102 { secret_data.doc, grocery_list.doc
104 { print function, save function
106 — export feature

U.S. PATENT DOCUMENTS

| | | | |
|---|---|---|---|
| 5,420,936 A | 5/1995 | Fitzpatrick et al. | 382/124 |
| 5,497,429 A | 3/1996 | Shibuya | 382/125 |
| 5,521,980 A * | 5/1996 | Brands | 380/30 |
| 5,615,277 A | 3/1997 | Hoffman | 382/115 |
| 5,748,184 A | 5/1998 | Shieh | 345/173 |
| 5,764,222 A | 6/1998 | Shieh | 345/173 |
| 5,838,306 A | 11/1998 | O'Connor et al. | 345/163 |
| 5,841,888 A | 11/1998 | Setlak et al. | 382/124 |
| 5,852,670 A | 12/1998 | Setlak et al. | 382/126 |
| 5,872,559 A | 2/1999 | Shieh | 345/157 |
| 5,874,948 A | 2/1999 | Shieh | 345/173 |
| 5,887,140 A | 3/1999 | Itsumi et al. | 709/225 |
| 5,915,035 A | 6/1999 | Hsiao et al. | 382/125 |
| 5,933,515 A | 8/1999 | Pu et al. | 382/124 |
| 5,956,415 A | 9/1999 | McCalley et al. | 382/124 |
| 5,963,679 A | 10/1999 | Setlak | 382/312 |
| 5,978,495 A * | 11/1999 | Thomopoulos et al. | 382/124 |
| 6,055,637 A | 4/2000 | Hudson et al. | |
| 6,351,817 B1 * | 2/2002 | Flyntz | 713/202 |
| 6,424,249 B1 * | 7/2002 | Houvener | 340/5.82 |
| 2002/0010679 A1 * | 1/2002 | Felsher | 705/51 |
| 2002/0021805 A1 * | 2/2002 | Schumann et al. | 380/201 |
| 2002/0054695 A1 * | 5/2002 | Bjorn et al. | 382/124 |
| 2002/0063154 A1 * | 5/2002 | Hoyos et al. | 235/382.5 |
| 2002/0124176 A1 * | 9/2002 | Epstein | 713/186 |
| 2003/0028811 A1 * | 2/2003 | Walker et al. | 713/202 |

* cited by examiner

| User ID | Authorization Level |
|---|---|
| User A | Top Secret |
| User B | Unclassified |
| User C | Secret |
| User D | Secret |
| . | . |
| . | . |
| . | . |
| User N | Unclassified |

| Resource ID | Authorization Level Required |
|---|---|
| secret_data.doc | Top Secret |
| grocery_list.doc | Unclassified |
| . | |
| . | |
| print function | Secret |
| save function | Confidential |
| . | |
| . | |
| export feature | Top Secret |

SECURE SYSTEM AND METHOD FOR ACCESSING FILES IN COMPUTERS USING FINGERPRINTS

BACKGROUND AND SUMMARY OF THE INVENTION

The present invention relates generally to computer access systems and file access systems. More particularly, the invention relates to a system and method to attach different authorization levels to computer files resources which are then accessed by the user's fingerprint. The computer or computer system includes a touch pad to which the user inputs his/her fingerprint. The touch pad can also serve as an input device for cursor control.

Computer security has become an important topic, particularly in view of the widespread use of computers and the Internet. Most computer users are familiar with the traditional user ID and password as a security mechanism for logging onto a computer system, and optionally for gaining access to certain secure files. One problem, of course, is that user IDs and passwords are subject to security attack. User IDs and passwords can be guessed. Some users even employ the unrecommended practice of writing their passwords on a note placed near the computer for easy access, not only by themselves, but also by unauthorized interlopers. In a network computer environment, some users will walk away from their computer or workstation, leaving the system logged on where any other person may gain access to the computer network by simply borrowing the other person's computer. Some computer application programs are even designed to store user ID and passwords, so that the user does not need to type them every time the computer is used. This can make the computer a potential security risk. Laptop computers are particularly vulnerable, cause they are frequently carried to insecure locations, such as airport terminals, where they are more likely to be stolen.

In the interest of addressing the above security issues, the present invention employs a fingerprint reading device that the computer user must first touch before access to the computer or to protected files or computer resources are granted. In one embodiment, the touch pad is integrated with the cursor control touch pad, making the embodiment ideal for laptop computers. The system maintains a data store of authorized user fingerprints, which may be stored in an encrypted form. A pattern matching algorithm compares the user's fingerprint, entered through the touch pad, with the fingerprint data in the data store, utilizing a decryption module to access the data as needed. The user's identity is then either identified from the fingerprint or verified from the fingerprint and a user authorization level is attached to the user ID for the file resource operation requested by the user. The authorization level data may also be encrypted, making it more difficult for a computer hacker to mimic the fingerprint pattern matching operation. The user's ID and authorization level information is then sent to an access module which causes the operating system to grant access to the file resources requested by the user. The access module also utilizes the decryption modules services, as required, to decrypt the authorization level generated during the authorization level assignment.

The system is configured so that it is resistant to tampering or attack by hackers. In its most secure form, each module operates using encrypted data and stores its output data in an encrypted form designed only to be read by other modules within the system with a need to utilize the information. The system is thus designed to make it difficult for hackers to spoof a given module by supplying data that mimics the output of another module. This security feature allows the system to be implemented across a network, if desired. Thus, although the fingerprint reading device may be physically embodied in the computer, or in the computer cursor control or keyboard, the fingerprint reading device may alternatively be used in a network environment where the computer being accessed is located remote from the reading device.

The invention allows the user's fingerprint to serve as either the user's identification indicia, or the user's password indicia, or both. If desired, conventional text-based user ID and passwords can be used along with the user's fingerprint for added security. The user's fingerprint can be used not only to access files but also other computer system resources. In one embodiment, the computer resource can be a hyperlink on a web page. The system denies access to that hyperlink unless the user's fingerprint is on the authorized list. In an embodiment that uses the computer touch pad for both cursor control and fingerprint identification, the system allows the authorized user to manipulate the cursor to the desired hyperlink and open the link, whereas unauthorized users will not be able to open the link. In some systems the user's fingerprint can be used for basic log on identification. In other more secure applications, the user's fingerprint may be required for specific file access or specific record access, or for specific computer resource access each time access is requested. For a more complete understanding of the invention, its objects and advantages, refer to the following specification and to the accompanying drawings.

DESCRIPTION OF THE PREFERRED EMBODIMENTS

Figure 1:
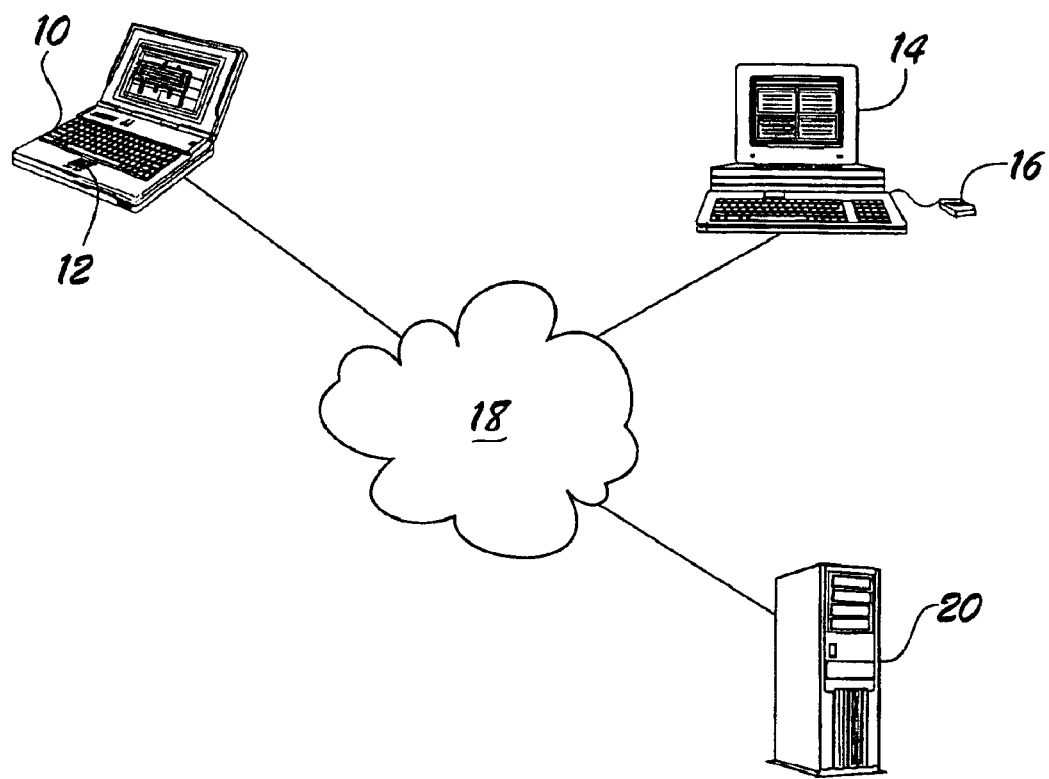
FIG. 1 is a system plan view illustrating implementation examples of the invention.

The secure system and method for accessing computer resources and file resources can be implemented in a variety of different ways. FIG. 1 illustrates several of these. With a laptop computer 10 the fingerprint reading device may be incorporated into the touch pad 12 designed for cursor control. In a computer workstation or desktop computer 14, the fingerprint reading device 16 may be a separate scanning unit attached by cable to the computer. Any of the computers can be attached to a computer network 18, such as the Internet, allowing them to communicate with remote server computers such as computer 20. As will be more fully explained below, the fingerprint reading mechanism can be integrated into a security system that spans network 18. Thus, the touch pad 12 for scanner 16 may be used in some embodiments to allow a user at the laptop 10 or workstation 14 to access resources on server 20. Thus, while the fingerprint security mechanism of the invention is well-suited for imposing security over local computer systems, the principles of the invention can readily be extended to network systems spanning the globe.

Figure 2:
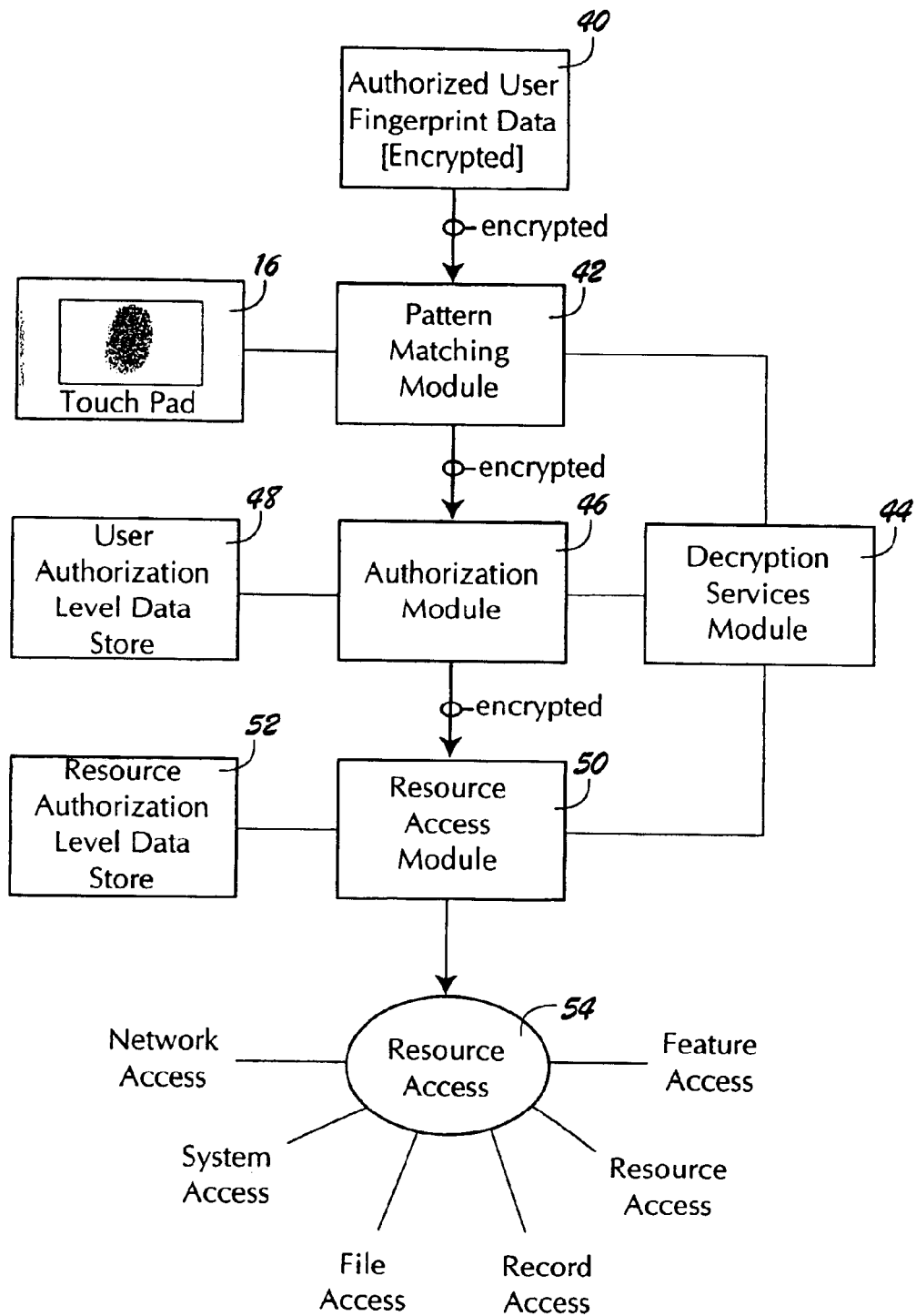
FIG. 2 is a system block diagram and data flow diagram illustrating a presently preferred embodiment of the invention.

Referring to FIG. 2, a presently preferred embodiment of the system is illustrated. Authorized user fingerprint data is stored in a suitable memory, preferably in an encrypted form. The authorized user fingerprint data is captured by a learning or training process whereby the user places his or her finger on a touch pad fingerprint scanner and the fingerprint is then digitized and converted to feature parameters representing the unique aspects of that person's fingerprint. The authorized user fingerprint data is then accessed by a pattern matching module 42 when the system is used. In such use the person wishing to gain access to computer resources places his or her finger on the touch pad scanner 16 and the user's fingerprint is thus digitized and parameterized using the same techniques that were employed during the original training operation. The pattern matching module 42 then compares the user's fingerprint data with data stored at 40, to determine whether a match can be found. The presently preferred pattern matching module is capable of performing both fingerprint authentication and fingerprint identification. Authentication involves a process whereby the user's identification is asserted, such as through a conventional log in process. The fingerprint is then used to verify or authenticate that the asserted user is in fact genuine. The identification process is related but somewhat different. In the identification process, the user's identity is not known and the fingerprint is thus used to ascertain the identity of the unknown user.

The presently preferred, more secure, embodiment uses encryption at each interface between modules. Thus the information stored at 40 is encrypted and must be decrypted by the pattern matching module 42 in order for that module to use the information. Of course, a less secure embodiment can also be implemented, in which case the fingerprint data need not be encrypted and the pattern matching module can access the data without performing decryption steps. In the illustrated embodiment, a decryption services module 44 provides decryption functionality to the pattern matching module 42. In other words, the pattern matching module uses the resources of the decryption services module 44 in decrypting the fingerprint data stored at 40. As illustrated, the decryption services module 42 can be used by other modules as well. Alternatively, each module can embed its own decryption service routines.

Figures 3, 4, 5:
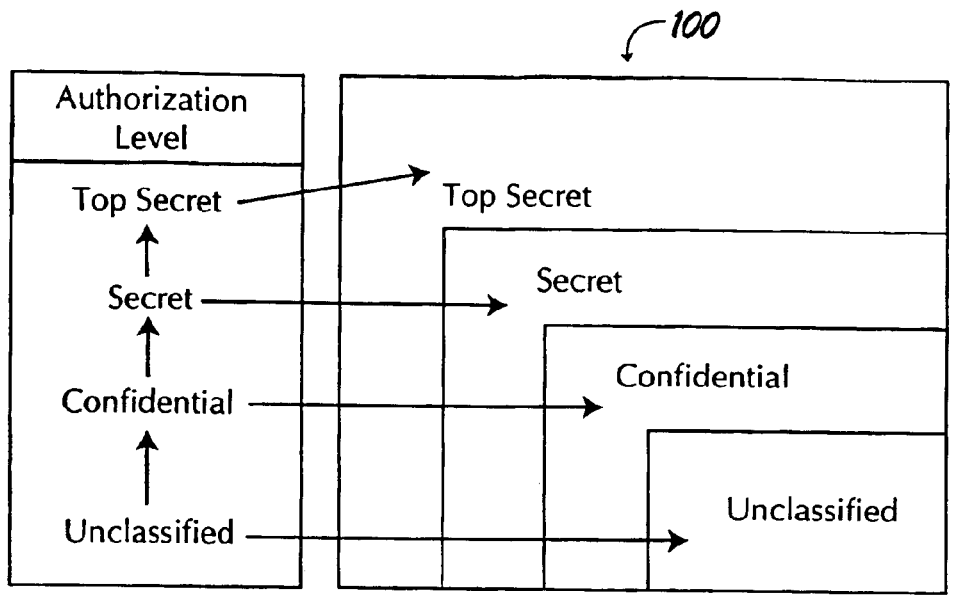
FIG. 3 is a data structure diagram illustrating a hierarchical authorization level useful in practicing the invention.
FIG. 4 is a data structure diagram illustrating the relationship between user ID and authorization level for a set of exemplary data.
FIG. 5 is a data structure diagram illustrating the relationship between resourse ID and authorization level for a set of exemplary data.

The pattern matching module outputs an indicia designating the authenticated identity of a user. In the presently preferred, most secure, embodiment, the authenticated user indicia is also encrypted to make it more difficult for hackers to mimic the output of the pattern matching module and thereby gain access to resources without authorization. The authenticated user identification indicia is used by the authorization module 46 to associate with the authenticated user a given authorization level. In the illustrated embodiment, the authorization module 46 accesses a data store 48 which contains a list of user authorization level information. Although there are a variety of different ways to assign authorization levels, a presently preferred embodiment uses a hierarchical authorization level as illustrated in FIG. 3. Resources at the lowest security level are designated as "unclassified", with higher levels of security being "confidential", "secret", and "top secret." Users having "top secret" authorization level would be permitted to utilize all resources within the computer system. Users with a "secret" authorization level would have access to a subset of resources available to the person with "top secret" clearance. Users with both "confidential" authorization level would, in turn, have access to a subset of what a person with "secret" authorization level would have. Finally, users with an "unclassified" authorization level would have access to a subset of only what persons with a "confidential" authorization level would have. Thus, as illustrated in FIG. 3, the person with "top secret" authorization level is able to access the entire block of computer system resources 100. Each of the succeeding sub-levels would have access to an increasingly smaller portion of those resources.

The authorization module associates an authorization level with a given user, as identified by the pattern matching module 42. Thus the user authorization level data store 48 may contain a list of user identifiers and their associated authorization level. A suitable data structure for data store 48 is illustrated in FIG. 4, where exemplary data has been given for a plurality of users. The authorization module 46 accesses data store 48 to obtain the user's authorization level and associate it with the user's identifier. This information is then transferred to the resource access module 50. In the presently preferred, most secure, embodiment, the information communicated from authorization module 46 to access module 50 may also be encrypted. The authorization module 46 and access module 50 both utilize the decryption services module 44 in this regard.

The resource access module 50 has an associated data store 52 where resource authorization level data is stored. FIG. 5 shows an exemplary data structure that would be suitable for storing authorization levels associated with individual computer file resources, feature resources and system resources. In FIG. 5, exemplary file resources are illustrated at 102, exemplary system resources at 104 and an exemplary feature resource at 106. Associated with each resource is the authorization level required to gain access to that resource. Thus using the exemplary data illustrated, a person would require "top secret" authorization level to open the file identified as "secret_data.doc." Similarly, a person would require "secret" authorization level in order to use the print function within the operating system. A person would require "top secret" authorization level to utilize the export feature of a program.

The resource access module 50 uses its data store 52 to determine what authorization level is required to use a particular resource. Module 50 is supplied the authorization level of the user by module 46, preferably in encrypted form. The resource access module thus determines the user's authorization level and ascertains from its data store 52 whether that user is authorized to utilize the desired resource. The resource access module 50 in turn communicates with the computer operating system to provide resource access to a variety of different resources as illustrated at 54. The list of features illustrated at 54 is intended to be exemplary and not exhaustive of all possible resources with which this system may be used.

From the foregoing it will be appreciated that the present invention can be implemented in a variety of different configurations, using different fingerprint reading mechanisms and different file structures. Although the preferred embodiment has been illustrated using encryption for all inter-modular communication, other systems are envisioned which would not require encryption between modules as illustrated. In addition, while a single fingerprint has been illustrated here, more advanced systems may utilize multiple fingerprints, such as multiple fingers of the user's hand or hands. Moreover, if desired, the system can be implemented to introduce a refresh cycle that would require the user to rescan his or her fingerprint at predetermined time intervals to increase security. It should also be apparent that the functions provided by the modules illustrated in FIG. 2 can be implemented in different ways, possibly combining several functions into a single module. Also, it should be apparent that communication from one module to another may be effected across a network connection such as across the Internet. Thus, for example, the touch pad scanner 16 and pattern matching module 42 might be physically located in one computer while the authorization module 46 might be located in yet another computer. The resource access module 50 could, in turn, be located in a third computer or in any of the preceding computers. Thus, if desired, the authorization module 46 functionality could be implemented via an Internet connection with the pattern matching module 42 functionality and the resource access module 50 functionality being located at the local user's workstation. Of course, other physical layouts and modular distributions are also possible within the scope of the invention.

While the invention has been described in its presently preferred embodiments, it will be appreciated that the invention is capable of implementation in a variety of different ways without departing from the spirit of the invention as set forth in the appended claims.

What is claimed is:

1. A secure computer resource access system, comprising:
   a fingerprint reading device for reading fingerprints of human users;
   a store of fingerprint data corresponding to a plurality of different users;
   an authorization system coupled to said reading device and configured to access said store and to associate an authorization level with a user based on the user's fingerprint;
   an access mechanism that defines a plurality of different authorization levels associated with a plurality of file resources, said access mechanism including at least one fingerprint matching module having a first secure interface to said fingerprint device and at least one authorization module having a second secure interface to said fingerprint matching module and a third secure interface to at least one resource access module;
   said access mechanism being responsive to said authorization system to control how a user can interact with said computer resource based on said associated authorization level; and
   a decryption service module in data communication with each of the fingerprint matching module, the authorization module and the resource access module and operable to provide decryption services thereto.

2. The access system of claim 1 wherein said fingerprint reading device is integral with a pointing device of a computer system.

3. The access system of claim 1 wherein said fingerprint reading device is integral with a keyboard device of a computer system.

4. The access system of claim 1 wherein said store of fingerprint data employs a data structure for storing said fingerprint data in an encrypted format.

5. The access system of claim 4 wherein said encrypted format is protected by a software key.

6. The access system of claim 1 wherein said authorization system communicates with said store of fingerprint data across an encrypted channel.

7. The access system of claim 1 wherein said authorization system communicates with said store of fingerprint data across a computer network.

8. The access system of claim 1 wherein said access mechanism controls file access within a computer system.

9. The access system of claim 1 wherein said access mechanism controls network access within a computer system.

10. The access system of claim 1 wherein said access mechanism controls record access within a computer system.

11. The access system of claim 1 wherein said access mechanism controls resource access within a computer system.

12. The access system of claim 1 wherein said access mechanism controls feature access within a computer system.

13. The access system of claim 1 wherein each one of said first secure interface, said second secure interface and said third secure interface comprising:
    a encryption sub-module encrypting outgoing information from a given secure interface;
    a decryption sub-module decrypting incoming information received by said given
    secure interface.

* * * * *